Patented Aug. 1, 1939

2,168,015

UNITED STATES PATENT OFFICE 2,168,015

THERMAL SEAL

William C. Calvert, Cuyahoga Falls, Ohio, assignor to Wingfoot Corporation, Wilmington, Del., a corporation of Delaware No Drawing. Application August 2, 1933, Serial No. 683,293

12 Claims. (Cl. 154—42)

This invention relates to a thermal seal of a rubber hydrochloride. It includes the seal and the method of forming it. More particularly, the invention relates to wrapping an article in a transparent sheet of rubber hydrochloride and sealing the edges to form an air-tight enclosure and also the air-tight enclosure thus formed.

Very recently transparent sheets or films of various materials have been placed on the market which are adapted to various uses. The chief use has been for wrapping articles to protect them from dust and in some cases also to protect them from moisture or to preserve their moisture content. The cellulosic product, generally known as "Cellophane", is quite widely used as a protection against dust and treated "Cellophane" where a moisture-proof covering is desired. In wrapping articles with "Cellophane", it is necessary to use a cement or other adhesive in joining the edges of the wrapper. This use of an adhesive has many disadvantages, among which may be mentioned the fact that the labor cost of supplying and applying the adhesive is not inconsiderable and if applied mechanically more or less complicated mechanism is necessary.

It has now been found that transparent films made of a rubber hydrochloride may readily be sealed by the use of pressure and heat and that no adhesive is necessary and for this reason such transparent sheets are to be preferred to "Cellophane" and the like. Sheets of rubber hydrochloride are moisture-proof and by thermally sealing the edges of a wrapper used to enclose an article which is to be protected from the moisture or the moisture content of which is to be preserved, an air-tight and moisture-proof wrapping can be formed. For most purposes it is preferable to use a rubber hydrochloride which softens sufficiently to form a seal, when heated to not more than 120° C.

There are various ways of forming the thermal seal of this invention. By overlapping two transparent sheets of a rubber hydrochloride or overlapping the edges of a single sheet of this character and applying heat and pressure with a hot iron or roll or other suitable means, the two sheets may be welded or fused together. By bringing the edges together a butt-joint may be formed. By applying heat and pressure to only restricted areas the two sheets may be fused together at only the places where heat and pressure are applied. Instead of merely overlapping the two sheets they may be creased and folded together and then by applying heat and pressure the various layers thus formed may be fused together. Two or more sheets may be joined together along the edge or in any desired manner. Similarly, a sheet of rubber hydrochloride may be sealed at the edge or in any desired manner, to an article made of paper, wood, etc. Also paper and the like which is coated with rubber hydrochloride may be sealed together or to other material by the application of heat and pressure.

In wrapping articles for display purposes or for protection it is advantageous to cover them with a transparent sheet of a rubber derivative and then seal all of the exposed edges of the sheet by the application of heat and pressure in order to form an air-tight and moisture-proof package. If the article to be wrapped is box-shape as, for example, a package of cigarettes, the package may be placed near the center of the transparent sheet and two opposite edges of the sheet may be brought together and sealed and then the sheet may be folded at the ends in the usual way or any desired manner and readily sealed by the application of heat and pressure to form an air-tight and moisture-proof enclosure. Or the sealing of the edges may be postponed until after the ends have been folded. If the article is of irregular shape the sheet may be folded around the article so as to cover it entirely and then the exposed edges sealed together to form an air-tight enclosure. With bodies of irregular shape it would be difficult or impossible to employ an adhesive and with articles of regular shape, such as cigarette packages the use of heat and pressure to form a thermal seal is less expensive and more efficient than the use of an adhesive. The enclosure formed by sealing all of the exposed edges is airtight and substantially moisture-proof. It may be used to exclude the moisture of the atmosphere and thus keep the contents of a package dry or it may be used to prevent the loss of moisture from articles such as foodstuffs, etc.

Sheets, more or less transparent, may be made from various rubber derivatives by solution in a suitable solvent with the subsequent spreading out of the solution in the form of a sheet or film with evaporation of the solvent.

The transparent sheet which is utilized in the preferred embodiment of this invention is essentially a hydrochloride of rubber formed by partially saturating the rubber with hydrogen chloride gas. The sheet may be formed, for example, by dissolving 20 pounds of plasticized pale crepe rubber in sufficient benzene to produce a 6% concentration. About 313 pounds of benzene will be required. Hydrogen chloride gas is introduced into this benzene solution cooled to about 10° C. while the solution is vigorously agitated. The rate of introduction of the hydrogen chloride gas may be varied but is so regulated that after six hours the increase in weight of the solution or suspension due to the introduction of hydrogen chloride is approximately 11.6 pounds. This corresponds to a slight excess over the amount theoretically required by the empirical formula $(C_5H_9Cl)_x$.

After discontinuing the introduction of the hydrogen chloride into the cement the mixture is allowed to stand and is tested from time to time until a washed and dried sample indicates on analysis or other test that the rubber is 85-90% saturated. A product containing about 29.5% of chlorine is preferred. This generally requires about 20 hours. The incompletely saturated rubber hydrochloride is then broken up on a rubber washer, washed thoroughly with water and dried in a vaccum drier at approximately 160° F.

The dried partially saturated rubber hydrochloride and an age-resister, such as a small amount of diphenyl guanidine, cyclohexyl amino aceto nitrile or methylene amino aceto nitrile, or preferably a mixture of 3% of dicyclohexyl amine and 1½% of hexamethylene tetramine, are then dissolved in chloroform, benzene or dichlor ethylene in the ratio of about 1 part by weight of rubber hydrochloride to 20 parts of the solvent. This is then flowed or sprayed onto a traveling belt equipped with a suitable scraping device to regulate the depth of the film and the chloroform is gradually evaporated. The film thus produced is not tacky at normal temperatures, substantially clear and transparent, impervious to air and substantially impervious to water, moderately concentrated acids and alkalis, mineral and vegetable oils and most organic salts. It has low inflammability. It may be colored with oil soluble dyes. By wrapping an article in a sheet of such material and sealing the exposed edges of the sheet by heating to 110 to 120° C. an air-tight and substantially water-proof enclosure is formed. Cigarettes, cigars, food-stuffs, etc., when wrapped in this way are protected from dust and air and their moisture current will remain substantially constant over a prolonged period of time.

The sheet is not damaged by creasing and in this respect is to be preferred over such sheets as "Cellophane" which on creasing are permanently damaged and rendered less efficient from the standpoint of protection against the air and the preservation of moisture content.

Although this invention relates more particularly to transparent sheets suitable for display purposes it includes sealing films of a rubber hydrochloride to form air-tight and substantially moisture-proof enclosures which are not transparent, and the enclosures thus formed.

This application is in part a continuation of application Serial No. 652,686, filed January 20, 1933. Application 703,557 which is also in part a continuation of application 652,686, has matured into Patent 1,989,632.

It is intended that the patent shall cover, by suitable expression in the appended claims, whatever features of patentable novelty reside in the invention.

What I claim is:

1. A thermal seal of a rubber hydrochloride.
2. Two sheets of rubber hydrochloride thermally sealed together.
3. A film of rubber hydrochloride two surfaces of which are thermally sealed together.
4. In a package and as a part of the packaging material thereof, an air-tight enclosure of a rubber hydrochloride.
5. In a package and as a part of the packaging material thereof, an air-tight, moisture-proof, flexible enclosure of a rubber hydrochloride film overlapping portions of which are coalesced together.
6. In a package and as a part of the packaging material thereof, an air-tight, moisture-proof, flexible enclosure of a rubber hydrochloride film overlapping portions of which are united by an air-tight moisture-proof bond.
7. In a package and as a part of the packaging material thereof, as the wrapper, a transparent, partially saturated, non-tacky rubber hydrochloride film which is substantially impervious to air and water, resistant to moderately concentrated acids and alkalies, and mineral and vegetable oils, parts of which film are joined together by a thermal seal of the rubber hydrochloride.
8. The method of forming a thermal seal of a rubber hydrochloride which comprises pressing a rubber hydrochloride against a surface while heating the rubber hydrochloride so as to cause it to fuse to the surface.
9. The method of forming a thermal seal between a transparent sheet of a rubber hydrochloride and another surface which comprises pressing at least a portion of the sheet against the surface while applying heat so as to cause the rubber hydrochloride to fuse to the surface.
10. The method of forming a thermal seal between two rubber hydrochloride surfaces which comprises pressing them together while heating so as to cause them to coalesce.
11. The method of packaging an article which comprises enclosing it in a transparent film of a non-tacky rubber hydrochloride and coalescing overlapping portions of the film by applying heat and pressure thereto.
12. The method of packaging an article which comprises enclosing it in an air-tight flexible rubber-hydrochloride-containing sheet material and making the package air-tight by pressing together and heating overlapping portions of the material so as to cause the rubber hydrochloride in said overlapping portions to coalesce together.

WILLIAM C. CALVERT.

CERTIFICATE OF CORRECTION.

Patent No. 2,168,015.  August 1, 1939.

WILLIAM C. CALVERT.

It is hereby certified that error appears in the printed specification of the above numbered patent requiring correction as follows: Page 1, second column, line 11, for the word "derivative" read hydrochloride; page 2, first column, line 48, for "current" read content; and that the said Letters Patent should be read with this correction therein that the same may conform to the record of the case in the Patent Office.

Signed and sealed this 14th day of November, A. D. 1939.

(Seal)

Henry Van Arsdale,
Acting Commissioner of Patents.